United States Patent

Chandrapati et al.

(10) Patent No.: US 8,920,757 B1
(45) Date of Patent: Dec. 30, 2014

(54) REDUCTANT DOSING CONTROL SYSTEMS AND METHODS

(71) Applicant: Cummins Emission Solutions Inc., Columbus, IN (US)

(72) Inventors: Srivardhan Chandrapati, Columbus, IN (US); Yongquan Chai, Columbus, IN (US); Stephen M. Holl, Columbus, IN (US); Shu Zhang, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 14/062,046

(22) Filed: Oct. 24, 2013

(51) Int. Cl.
  *B01D 53/94* (2006.01)
  *F01N 3/18* (2006.01)
  *F01N 3/20* (2006.01)

(52) U.S. Cl.
  CPC .................. *B01D 53/9495* (2013.01)
  USPC ........ 423/213.2; 422/105; 422/108; 422/112; 422/113; 60/274; 60/287; 60/291; 60/301

(58) Field of Classification Search
  USPC .............. 423/213.2; 422/105, 108, 112, 113; 60/274, 287, 291, 301
  See application file for complete search history.

(56) References Cited

U.S. PATENT DOCUMENTS

| | | | |
|---|---|---|---|
| 5,020,362 A | 6/1991 | Hart et al. | |
| 5,445,019 A | 8/1995 | Glidewell et al. | |
| 6,192,676 B1 * | 2/2001 | Zurbig et al. | 60/286 |
| 6,209,315 B1 * | 4/2001 | Weigl | 60/274 |
| 6,519,935 B2 * | 2/2003 | Weigl | 60/286 |
| 6,637,196 B1 * | 10/2003 | Tost | 60/286 |
| 7,332,142 B2 * | 2/2008 | Telford et al. | 423/210 |
| 7,543,485 B2 | 6/2009 | Chemello | |
| 8,104,334 B2 | 1/2012 | Wang et al. | |
| 8,118,006 B2 | 2/2012 | Pursifull | |
| 8,145,408 B2 * | 3/2012 | Karlsson et al. | 701/104 |
| 2002/0088220 A1 * | 7/2002 | Weigl | 60/286 |
| 2014/0030175 A1 * | 1/2014 | Hersel | 423/212 |
| 2014/0127097 A1 * | 5/2014 | Lack et al. | 423/212 |

* cited by examiner

*Primary Examiner* — Timothy Vanoy
(74) *Attorney, Agent, or Firm* — Foley & Lardner LLP

(57) ABSTRACT

Reductant dosing systems and methods for engine exhaust aftertreatment are disclosed. The opening and closing of a metering valve in the reductant dosing system is controlled in a manner that mitigates pressure oscillations in the dosing system. The metering valve is opened in response to the dosing command exceeding a minimum threshold value and the differential pressure across the metering valve exceeding a differential pressure threshold. The metering valve is closed in response to either the differential pressure across the metering valve dropping below a differential pressure threshold or the actual dosed quantity exceeding the dosing command.

23 Claims, 2 Drawing Sheets

US 8,920,757 B1

REDUCTANT DOSING CONTROL SYSTEMS AND METHODS

BACKGROUND

Selective catalytic reduction ("SCR") exhaust aftertreatment systems are an important technology for reducing NOx emissions from internal combustion engines such as diesel engines. SCR systems generally include a source of reductant such as a urea solution, a pump unit for pressurizing the urea solution, a metering unit for providing a controlled amount or rate of urea solution to an SCR catalyst, and an injector which provides urea solution to a urea decomposition region of an exhaust flowpath located upstream from an SCR catalyst. Many SCR systems also utilize pressurized gas to assist the flow of urea solution to the injector.

While providing important reductions in NOx emissions, SCR systems suffer from a number of shortcomings and problems. The supply of the urea solution under pressure can result in high pressure oscillations after long hours of continuous operation of the system. High pressure oscillations adversely affect system performance and deteriorate dosing accuracy. In addition, high pressure oscillations stress system components, in some cases beyond design limits, which creates reliability and warranty concerns. There is a long felt need for advancements mitigating these and other shortcomings associated with SCR systems utilizing pressurized dosing of a reductant such as a urea solution.

SUMMARY

Certain exemplary embodiments include systems and methods to control the opening and closing of a metering valve in a reductant dosing system in a manner that mitigates pressure oscillations in the dosing system. The metering valve is opened in response to a dosing command exceeding a minimum threshold value and the differential pressure across the metering valve exceeding a differential pressure threshold. The metering valve is closed in response to either the differential pressure across the metering valve dropping below a differential pressure threshold or the actual dosed quantity exceeding the integrated dosing command.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF EXEMPLARY EMBODIMENTS

Figure 1:
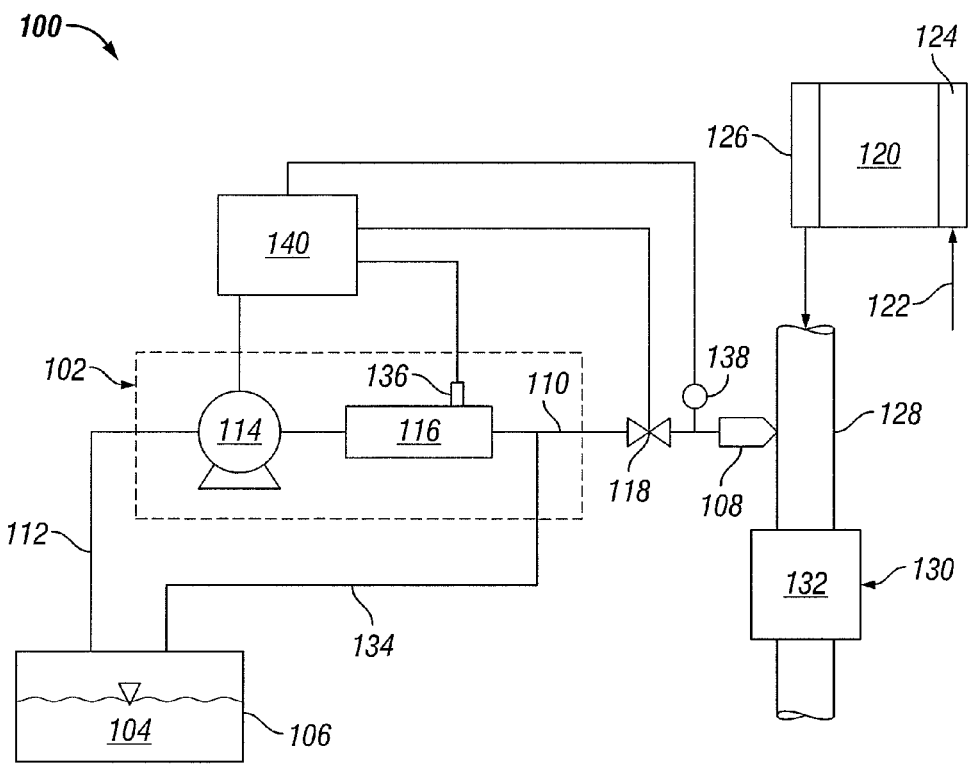
FIG. 1 is a schematic of an exemplary reductant dosing control system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

With reference to FIG. 1 there is illustrated an exemplary reductant dosing system 100 for injection of reductant into an exhaust aftertreatment system 130. Reductant dosing system 100 may be provided on a vehicle (not shown) powered by an internal combustion engine 120 such as a diesel engine, or on an engine utilized in other applications such power generation or pumping systems. Engine 120 includes an intake manifold 124 fluidly connected to an intake system 122 that receives fresh air flow and, in some embodiments, recirculated exhaust gas to provide a charge flow to a plurality of cylinders (not shown) of engine 120. After mixing of the charge flow with fuel and combustion in the combustion chambers of the cylinders, exhaust gas that is produced is provided to exhaust manifold 126. Exhaust manifold 126 is fluidly connected to an exhaust system 128 so that at least a portion of the exhaust gas is transported to aftertreatment system 130.

Reductant dosing system 100 includes a doser 102 that receives a reductant 104 from a storage tank 106 and provides the reductant under pressure to injector 108 or other structure for injection or delivery to a decomposition chamber or directly to the exhaust system 128. One example of a suitable reductant is a diesel exhaust fluid (DEF) which comprises a solution of 32.5% high purity urea and 67.5% deionized water. It shall be appreciated, however, that any suitable reductant for injection into an exhaust system with dosing system 100 may also be utilized.

In the illustrated embodiment the exhaust system 128 provides exhaust gas to an aftertreatment system 130 having one or more SCR catalysts 132. Exhaust system 128 includes one or more locations for receiving reductant 104 from reductant dosing system 100. The aftertreatment system 130 may include one or more other aftertreatment components not shown, such as one or more oxidation catalysts, one or more particulate filters, an ammonia oxidation catalyst, and various temperature, pressure and exhaust gas constituent sensors. Exhaust system 128 may also include various components not shown, such as one or more EGR systems, one or more turbocharger systems, intercoolers, aftercoolers, throttles, control valves, and other components. Reductant injector 108 is mounted on a portion of exhaust system 128 upstream of SCR catalyst 132 with its outlet, such as a nozzle located within the exhaust conduit, arranged to spray aqueous atomized reductant into the exhaust system where it mixes with engine exhaust gas produced by the engine 120. SCR catalyst 132 promotes a chemical reaction between the reductant and NOx in the exhaust gas that converts substantial amounts of NOx to reduce NOx emissions before the exhaust gas passes into the atmosphere.

Dosing system 100 may include various structures to facilitate receipt of reductant from storage tank 106 and the delivery of the reductant to the exhaust system 128. For example, doser 102 can include a reductant suction line 112 that is configured to draw reductant 104 from storage tank 106. Storage tank 106 holds a supply of aqueous reductant 104 and is vented to allow reductant to be withdrawn through reductant suction line 112 to doser 102.

Doser 102 can further include an accumulator 116 configured to maintain an accumulated quantity of reductant under pressure sufficient to ensure proper atomization and mixing of the reductant when injected into the exhaust carried by exhaust system 128. Doser 102 also includes a pump 114 that pressurizes the reductant in accumulator 116 to maintain the reductant under pressure during and between dosing cycles.

A first pressure sensor 136 is in fluid communication with reductant in accumulator 116. A metering valve 118 is configured to actuate and measure and amount or quantity of reductant 104 at a flow rate through a reductant supply line 110 to injector 108 for injection into the exhaust. A second pressure sensor 138 downstream of metering valve 118 is in fluid communication with reductant in supply line 110. A pressure differential ΔP across metering valve 118 can be determined by the difference in pressure readings from first and second pressure sensors 136, 138. Alternatively, first pressure sensor 136 or another pressure sensor can be provided immediately at the inlet of metering valve 118. In another embodiment, a single pressure sensor can be provided that indicates the pressure differential ΔP.

It is contemplated that reductant supply line 110 may include a throttle, a filter, a check valve, and other components not shown. Dosing system 100 further includes a reductant return line 134 that is configured to provide a controlled flow of reductant from downstream of accumulator 116 back to storage tank 106 to allow for stable pump control.

While FIG. 1 shows one example of a dosing system 100, other configurations and components not shown are possible. For example, pump 114 can be in the form of a diaphragm pump, though it shall be appreciated that other types of pumps may be utilized. Check valves can be located between various components. Pulsation dampeners, filters, and metering devices can provided within doser 102. Doser 102 may further include a bypass line around the pump 114 having a bypass valve which is operable to open and close to permit or prevent the flow of reductant through the bypass line to a location where it may be returned to the storage tank 106, for example, during a purging operation. Doser 102 may further include an air assist arrangement to receive compressed air in a blending chamber that receives reductant from the metering valve at a controllable rate. The blending chamber may also receive a flow of pressurized air from an air supply (not shown) and discharges a combined flow of pressurized air and reductant at an outlet of doser 102. The air supply may be integral to a vehicle, integral to engine 120, or may be an air supply dedicated to dosing system 100. It shall be understood that additional embodiments may utilize pressurized gases other than air, for example, combinations of one or more inert gases. Reductant dosing system 100 may be further connected with a heat exchange system (not shown) through which a heat exchange fluid, such as engine coolant, is circulated by a pump to provide heating of reductant 104.

Reductant dosing system 100 may be controlled and monitored by a controller 140 such as an engine control module (ECM) and/or a doser control module (DCM). It shall be appreciated that the controller or control module may be provided in a variety of forms and configurations including one or more computing devices having non-transitory memory storing computer executable instructions, processing, and communication hardware. It shall be further appreciated that controller may be a single device or a distributed device, and the functions of the controller may be performed by hardware or software.

Controller 140 is operatively coupled with and configured to store instructions in a memory which are readable and executable by controller 140 to control doser 102, pump 114 and metering valve 118 to provide a commanded quantity of reductant 104 at a commanded flow rate and pressure to injector 108. Controller 140 is also operatively coupled to and may receive signals from, for example, pressure sensors 136, 138. Pressure sensors 136, 138 is operable to provide a signal indicating the differential pressure ΔP of the reductant 104 across metering valve 118. The differential pressure ΔP at this location may be pressure of a combined flow of pressurized air and reductant, or the pressure of reductant 104 alone, across metering valve 118. Additional pressure sensors and one or more temperature sensors may be provided and operable to provide a signal to controller 140 indicating the temperature and/or pressure of reductant at a location downstream or upstream of pump 114.

Controller 140 is structured to perform certain operations to operate dosing system 100 to minimize or reduce pressure oscillations caused by opening and closing of metering valve 118 over several dosing cycles while dosing reductant over the dosing cycles to satisfy an integrated dosing command determined by controller 140 for treatment of emissions in the exhaust. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. In certain embodiments, the controller 140 includes one or more modules structured to functionally execute the operations of the controller in hardware and/or software on computer readable medium, and may be distributed across various hardware or software components. More specific descriptions of certain embodiments of controller configurations and operations are included in the discussion that follows.

The controller 140 is in communication with any component of the system to gather information, process the information, provide commands, and control operations of certain components. The controller 140 includes stored data values, constants, and functions, as well as operating instructions stored on computer readable medium. Any of the operations of exemplary procedures described herein may be performed at least partially by the controller 140.

Figure 2:
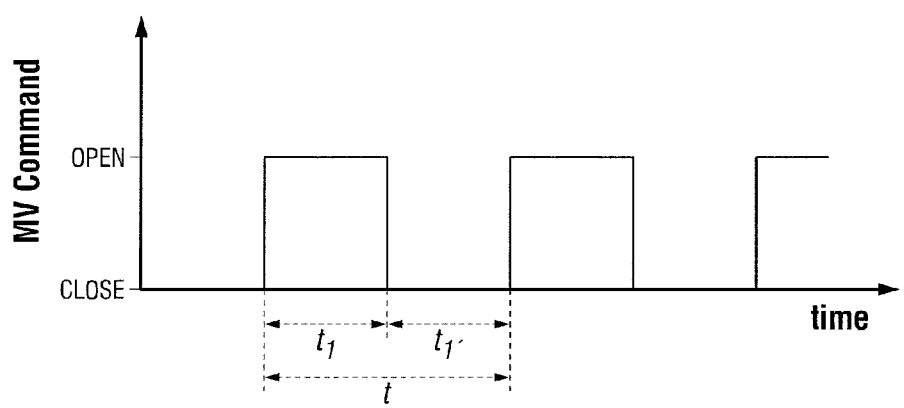
FIG. 2 is a flow diagram of a reductant dosing control procedure.

Referring to FIG. 2, during operation of system 100, a predetermined quantity of reductant 104 calculated by controller 140 is supplied to exhaust system 128 by dosing system 102 during a dosing cycle to satisfy a dosing command. Each dosing cycle includes a number of dosing periods t in which metering valve 118 is opened to initiate a dosing on-time $t_1$ and then closed at the end of the dosing on-time $t_1$ for the remainder of the dosing period $t_1'$. Typically, the dosing on-time $t_1$ is approximately the same as the dosing off-time $t_1'$ during each dosing period t. As used herein the dosing on-time $t_1$ is the length of time from when metering valve 118 is opened to when metering valve 118 is closed during each dosing period t of the dosing cycle. The dosing off-time $t_1'$ is the length of time the metering valve 118 is closed during the dosing period t.

During operation, dosing system 102 supplies reductant in response to a dosing command that is determined by controller 140. The dosing command is determined by controller 140 interpreting operating conditions of engine 120 and exhaust system 128 to determine a quantity of reductant to inject into exhaust system 128 according to programmed operating instructions. Prior dosing systems establish a length of the duty cycle over which the quantity to be injected is provided by a series of injections of fixed on-times and off-times. The dosing command is satisfied during the duty cycle of operation of dosing system 102 by cycling metering valve 118 to provide a predetermined flow rate of reductant through a predetermined number of fixed-in-time dosing periods. The fixed time periods are established to avoid cycling the metering valve on and off too frequently, which impacts the operating life of the metering valve.

The systems and methods disclosed herein avoid cycling the on-time $t_1$ and off-time $t_1'$ of metering valve 118 at a fixed frequency over a duty cycle of predetermined length to satisfy a dosing command. Rather, controller 140 is configured to vary the frequency of opening and closing of metering valve 118 by varying the on-time $t_1$ and off-time $t_1'$ of each dosing period t of operation of metering valve 118 to synchronize operation of metering valve 118 with system operating conditions. This variable frequency operation of metering valve 118 reduces high pressure oscillation in dosing system 102 by frequently opening and closing metering valve 118 in a variable manner tied to operating conditions to permit more frequent relief of pressure in dosing system 102. In addition, since the opening and closing of metering valve 118 are each tied to system operating conditions, the dosing system 102 is maintained in its regions of optimal performance. As a result, high pressure peaks are reduced and components of dosing system 102 are operated at lower pressure variations and are maintained within pressure design limits as compared to a fixed frequency of opening and closing metering valve 118.

Figure 3:
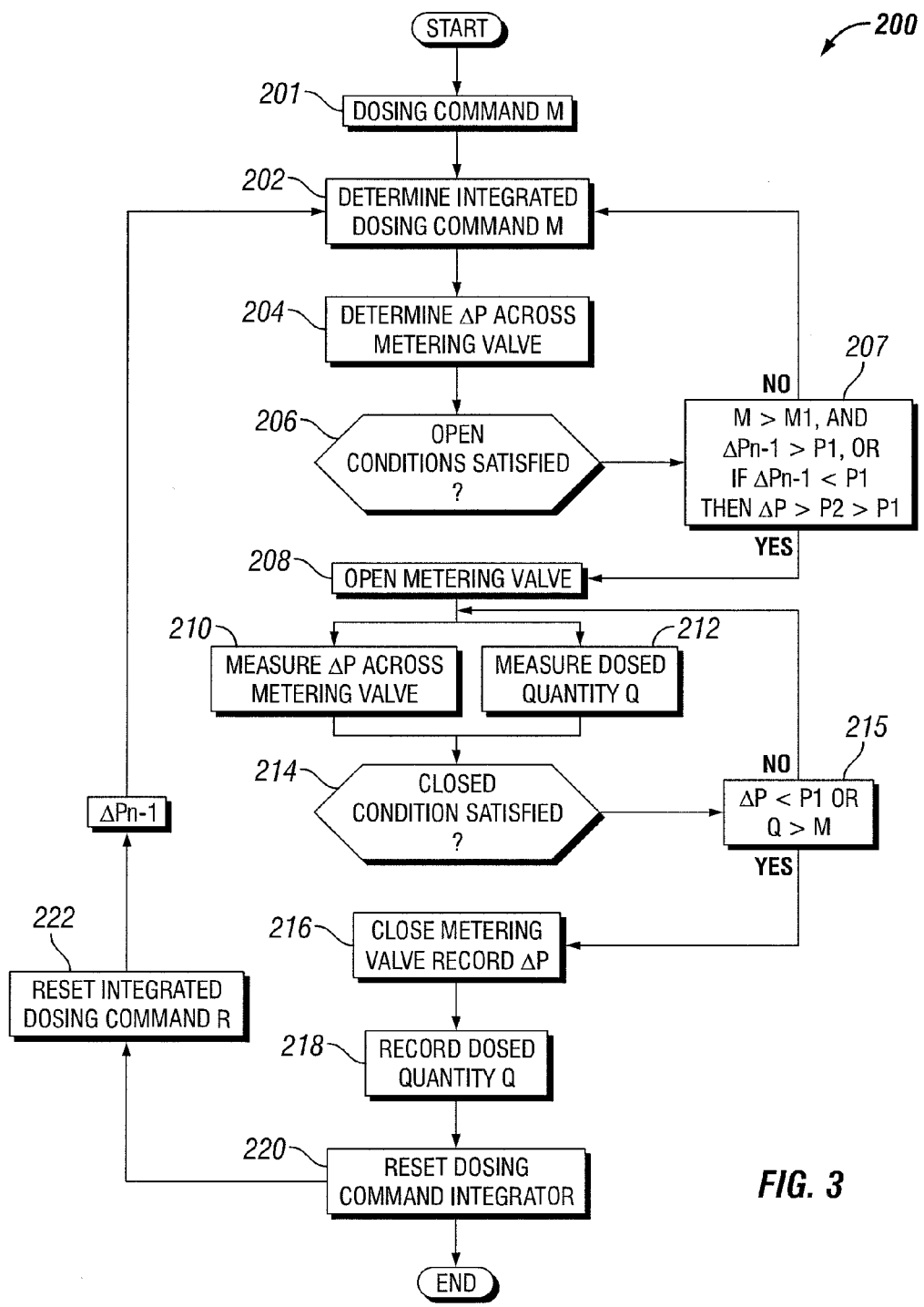
FIG. 3 is a flow diagram of a further reductant dosing control procedure.

Metering valve 118 is actuated on and off to provide reductant to injector 108 in each dosing period for dosing into the exhaust system 128. Controller 140 is configured to interpret the differential pressure ΔP, an integrated dosing command, and an actual dosed quantity of reductant to determine when to open and/or close the metering valve 118. Referring to FIG. 3, there is shown one embodiment of a procedure 200 for determining opening and closing conditions for metering valve 118 that is executable by controller 140.

Procedure 200 starts at, for example, a key-on of the vehicle, or by a re-set event. Procedure 200 includes an operation 201 to determine dosing command M' that includes a quantity of reductant that is determined by controller 140 for injection into the exhaust stream to, for example, provide treatment of NOx emissions from engine 120. Any suitable procedure and parameters of operation of engine 120, exhaust system 128, aftertreatment system 130, and/or dosing system 102 may be considered in determining the quantity of reductant to be included in the dosing command M'. Procedure 200 further includes an operation 202 in which an integrated dosing command M is determined by controller 140. The integrated dosing command M includes the dosing command M' integrated to account for actual dosing that has occurred to satisfy the dosing command M' and, as discussed further below, the integrated dosing command M can further include a compensation for under-dosing or over-dosing that occurs in a previous dosing period.

Procedure 200 continues at operation 204 in which the differential pressure ΔP across metering valve 118 is determined. Procedure 200 then continues at conditional 206 to determine if open conditions for metering valve 118 are satisfied. In one embodiment, conditions to open metering valve 118 are satisfied if operation 207 determines that the integrated dosing command M is greater than a threshold amount M1 and if the differential pressure $\Delta P_{n-1}$ at the previous closing of metering valve 118 was above a first differential pressure threshold P1. If the differential pressure $\Delta P_{n-1}$ was less than first threshold P1 at the previous closing of the metering valve 118, then the opening conditions are not satisfied until the current differential pressure ΔP is more than a second pressure differential threshold P2, which is greater than first differential pressure threshold P1. By avoiding opening the metering valve 118 when the current differential pressure ΔP is too small, the pressure in dosing system 102 is maintained so that it will not be reduced to a value that affects system performance by being too low. Low system pressure can affect the accuracy of reductant dosing since the reductant pressure drops to closely to the air pressure in an air assisted system. In addition, the pressure control scheme ensures that metering valve 118 does not open too frequently, which reduces operating life of metering valve 118.

If conditional 206 is negative due to either of the integrated dosing command being less than threshold M1 or the differential pressure ΔP being less than second differential pressure threshold P2 when the differential pressure $\Delta P_{n-1}$ was less than first differential pressure threshold P1, procedure 200 returns to operation 202 to update the integrated dosing command M and to re-determine the current differential pressure ΔP. Updating the integrated dosing command M can include, for example, integrating a new dosing quantity required to satisfy emissions aftertreatment requirements in view of operating conditions. When metering valve open conditions are satisfied at conditional 206, procedure 200 continues at operation 208 and metering valve 118 is opened.

When metering valve 118 is opened, procedure 200 continues at operations 210 and 212 to monitor for metering valve closing conditions. Operation 210 includes measuring the differential pressure ΔP at periodic intervals and operation 212 includes measuring the dosed quantity of reductant passing through metering valve 118. Procedure 200 continues at conditional 214 while metering valve is opened and while performing operations 210, 212 to determine whether closed conditions for closing metering valve 118 are satisfied. In one embodiment, as indicated in the closed conditions are satisfied when operation 215 determines either differential pressure ΔP is less than first differential pressure threshold P1 or the actual or measured quantity of reductant that is dosed exceeds the integrated dosing command M. The closing conditions prevent the system pressure from dropping below a predetermined threshold while, in cases where the metering valve differential pressure ΔP does not drop less than P1, limiting dosing to the actual quantity of reductant required to satisfy the integrated dosing command. If closing conditions for closing metering valve 118 are not satisfied, procedure 200 returns to operations 210 and 212 to monitor metering valve closing conditions.

When metering valve closing conditions are satisfied at conditional 214, procedure 200 continues at operation 216 in which the differential pressure ΔP at the closing of metering valve 118 is recorded. This differential pressure is then provided for use as differential pressure $\Delta P_{n-1}$ at operation 202 in the determination that metering valve open conditions are satisfied at operation 207, as discussed above. Procedure 200 then continues at operation 218 and determines the actual or measured quantity Q of reductant that was dosed while metering valve 118 was open. The actual quantity Q of dosed reductant is compared to the integrated dosing command M, and the integrated dosing command M is reset at operation 220 to the difference between the actual quantity Q and the reductant dosing command M. The reset integrated dosing command R is then provided at operation 222 for use at operation 202 in the determination of a new integrated dosing command M. The reset integrated dosing command R accounts for any under—dosing or over-dosing of reductant that might have occurred while metering valve 118 is opened, and modifies any additional reductant amount M' that is required by system operating conditions to determine the new integrated dosing command M for the next iteration of procedure 200.

In certain embodiments, if controller 140 determines that a low dosing rate is to be used to satisfy the dosing command, the dosing command threshold M1 is set by a constant multiplied by the dosing rate to ensure that the dosing system 102 injects reductant at a minimum frequency. The modified dosing command threshold prevents large dosing quantities from being injected during the same dosing on-time and avoids long dosing on—time intervals.

Various aspects of the systems and methods disclosed herein are contemplated. According to one aspect, a method includes determining a dosing command that includes a quantity of a reductant to inject with a dosing system for treatment of an exhaust gas in an exhaust system that includes a selective catalytic reduction catalyst and injecting the reductant into the exhaust system through a metering valve of with the dosing system while measuring the quantity of injected reductant. Injecting the reductant also includes closing the metering valve from an open condition when either a differential pressure across the metering valve is less than a first differential pressure threshold or the measured quantity of injected reductant is greater than the quantity of reductant to inject of the dosing command; and opening the metering valve from a closed condition when the quantity of reductant to inject of the dosing command is more than a threshold amount and, when the metering valve is in the closed condition in response to the differential pressure being less than the first differential pressure threshold, the differential pressure being more than a second differential pressure threshold, wherein the second differential pressure threshold is greater than the first differential pressure threshold.

In one embodiment, after closing the metering valve, the method includes determining a difference between the measured quantity of injected reductant and the quantity of the reductant to inject of the dosing command; resetting the dosing command to the difference; and after resetting, opening the metering valve from the closed condition when the quantity of reductant to inject of the dosing command is more than the threshold amount and, if the differential pressure at closing of the metering valve is less than the first differential pressure threshold, when the differential pressure is more than the second differential pressure threshold.

In another embodiment, injecting the reductant includes sequentially closing and opening the metering valve a plurality of times. In one refinement of this embodiment, an on-time in which the metering valve is open and an off-time in which the metering valve is closed varies over the plurality of times.

In another embodiment, the method includes pressurizing the reductant with a pump of the dosing system. In one refinement of this embodiment, the metering valve is connected downstream of the pump, and an injector is connected to the exhaust system downstream of the metering valve. In yet another embodiment, in response to the metering valve being in the closed condition due to the measured quantity of reductant being more than the quantity of reductant to inject, the method includes determining an integrated dosing command and opening the metering valve from the closed condition in response to the quantity of reductant to inject of the integrated dosing command being more than the threshold amount.

According to another aspect, a method includes injecting a quantity of a reductant with a dosing system in response to a dosing command to treat an exhaust gas in an exhaust system that includes a selective catalytic reduction catalyst. Injecting the quantity of the reductant includes sequentially opening and closing a metering valve during a dosing cycle to selectively pass reductant through the metering valve to the exhaust system. The metering valve is opened from a closed condition when the dosing command is more than a threshold amount of reductant and the differential pressure across the metering valve is more than a differential pressure threshold, and the metering valve is closed from an open condition when the differential pressure across the metering valve is either less than the differential pressure threshold or an injected quantity of the reductant is greater than the dosing command.

In one embodiment of the method, the differential pressure threshold includes a first differential pressure threshold and a second differential pressure threshold that is greater than the first differential pressure threshold and, when the metering valve is in the closed condition in response to the differential pressure across the metering valve being less than the first differential pressure threshold, opening the metering valve requires the differential pressure across the metering valve being more than the second differential pressure threshold. In one refinement of this embodiment, closing the metering valve from the open condition includes the differential pressure across the metering valve being less the first differential pressure threshold or the injected quantity of the reductant being greater than the dosing command. In a further refinement, in response to the metering valve being in the closed condition in response to the injected amount of reductant being more than the dosing command, the metering valve is opened if the dosing command is more than the threshold amount.

In another embodiment of the method, an on-time in which the metering valve is open varies over the dosing cycle and an off-time in which the metering valve is closed varies over the dosing cycle. In yet another embodiment, the method includes pressurizing the reductant with a pump of the dosing system.

In another aspect a system is provided that includes a doser fluidly connected to a source of reductant. The doser is connected to an exhaust system with a metering valve between the doser and the exhaust system, and the doser includes a pump operable to pressurize the reductant through the metering valve in response to a dosing command. The system also includes a pressure sensor associated with the metering valve operable to indicate a differential pressure across the metering valve and a controller connected to the metering valve that is configured to selectively open and close the metering valve in response to a measured quantity of reductant through the metering valve and the differential pressure. The controller is configured to close the metering valve from an open condition when either the differential pressure across the metering valve is either less than a first differential pressure threshold or the measured quantity of the reductant is greater than the dosing command. The controller is also configured to open the metering valve from a closed condition when the dosing command is more than a threshold amount and, when the metering valve is in the closed condition in response to the differential pressure being less than the first differential pressure threshold, the differential pressure being more than a second differential pressure threshold, wherein the second differential pressure threshold is greater than the first differential pressure threshold.

In one embodiment, the doser further includes an accumulator downstream of the pump and upstream of the metering valve. In another embodiment, the metering valve is fluidly connected to an injector that is coupled to the exhaust system. In yet another embodiment, the pressure sensor includes a first pressure sensor downstream of the metering valve and a second pressure sensor upstream of the metering valve. In still another embodiment, the system includes an internal combustion engine operable to produce an exhaust gas that is received in the exhaust system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    determining a dosing command that includes a quantity of a reductant to inject with a dosing system for treatment of an exhaust gas in an exhaust system that includes a selective catalytic reduction catalyst; and
    injecting the reductant into the exhaust system through a metering valve of the dosing system over a variable frequency dosing cycle while measuring a quantity of injected reductant, wherein the variable frequency dosing cycle includes:
        closing the metering valve from an open condition when either a differential pressure across the metering valve is less than a first differential pressure threshold or the measured quantity of injected reductant is greater than the quantity of reductant to inject from the dosing command; and
        opening the metering valve from a closed condition when the quantity of reductant to inject from the dosing command is more than a threshold amount and, when the metering valve is in the closed condition in response to the differential pressure being less than the first differential pressure threshold, the differential pressure being more than a second differential pressure threshold, wherein the second differential pressure threshold is greater than the first differential pressure threshold.

2. The method of claim 1, wherein after closing the metering valve, further comprising:
    determining a difference between the measured quantity of injected reductant and the quantity of the reductant to inject from the dosing command;
    resetting the dosing command to the difference; and
    after resetting the dosing command, opening the metering valve from the closed condition when the dosing command is more than the threshold amount and, if the differential pressure at closing of the metering valve is less than the first differential pressure threshold, when the differential pressure is more than the second differential pressure threshold.

3. The method of claim 1, wherein the variable frequency dosing cycle includes sequentially closing and opening the metering valve a plurality of times.

4. The method of claim 3, wherein an on-time during which the metering valve is open and an off-time during which the metering valve is closed varies over the plurality of times.

5. The method of claim 1, further comprising pressurizing the reductant with a pump of the dosing system.

6. The method of claim 5, wherein the metering valve is connected downstream of the pump, and further comprising an injector connected to the exhaust system downstream of the metering valve.

7. The method of claim 1, wherein, in response to the metering valve being in the closed condition due to the measured quantity of injected reductant being more than the quantity of reductant to inject of the dosing command, determining an integrated dosing command and opening the metering valve from the closed condition in response to the quantity of reductant to inject of the integrated dosing command being more than the threshold amount.

8. A method, comprising:
    injecting a quantity of a reductant with a dosing system over a variable frequency dosing cycle in response to a dosing command to treat an exhaust gas in an exhaust system that includes a selective catalytic reduction catalyst, wherein the variable frequency dosing cycle includes sequentially opening and closing a metering valve during a dosing cycle to selectively pass reductant through the metering valve to the exhaust system, wherein the metering valve is opened from a closed condition when the dosing command is more than a threshold amount of reductant and the differential pressure across the metering valve is more than a differential pressure threshold, and closing the metering valve from an open condition when the differential pressure across the metering valve is either less than the differential pressure threshold or an injected quantity of the reductant is greater than the dosing command.

9. The method of claim 8, wherein the differential pressure threshold includes a first differential pressure threshold and a second differential pressure threshold that is greater than the first differential pressure threshold and, when the metering valve is in the closed condition in response to the differential pressure across the metering valve being less than the first differential pressure threshold, opening the metering valve requires the differential pressure across the metering valve being more than the second differential pressure threshold.

10. The method of claim 9, wherein closing the metering valve from the open condition includes the differential pressure across the metering valve being less the first differential pressure threshold or the injected quantity of reductant is greater than the dosing command.

11. The method of claim 10, wherein, in response to the metering valve being in the closed condition in response to the injected amount of reductant being more than the dosing command, opening the metering valve if the dosing command is more than the threshold amount.

12. The method of claim 8, wherein an on-time in which the metering valve is open varies over the dosing cycle and an off-time in which the metering valve is closed varies over the dosing cycle.

13. The method of claim 8, further comprising pressurizing the reductant with a pump of the dosing system.

14. A system, comprising:
    a doser fluidly connected to a source of reductant, wherein the doser is connected to an exhaust system with a metering valve between the doser and the exhaust system, and the doser includes a pump operable to pressurize the reductant through the metering valve in response to a dosing command;
    a pressure sensor associated with the metering valve operable to indicate a differential pressure across the metering valve; and
    a controller connected to the metering valve that is configured to selectively open and close the metering valve over a variable frequency dosing cycle in response to a measured quantity of reductant through the metering valve and the differential pressure, wherein the controller is further configured to:

close the metering valve from an open condition when either the differential pressure across the metering valve is either less than a first differential pressure threshold or the measured quantity of the reductant is greater than the dosing command; and open the metering valve from a closed condition when the dosing command is more than a threshold amount and, if the metering valve is in the closed condition in response to the differential pressure being less than the first differential pressure threshold, when the differential pressure is more than a second differential pressure threshold, wherein the second differential pressure threshold is greater than the first differential pressure threshold.

15. The system of claim 14, wherein the doser further includes an accumulator downstream of the pump and upstream of the metering valve.

16. The system of claim 14, wherein the metering valve is fluidly connected to an injector that is coupled to the exhaust system.

17. The system of claim 14, wherein the pressure sensor includes a first pressure sensor downstream of the metering valve and a second pressure sensor upstream of the metering valve.

18. The system of claim 14, further comprising an internal combustion engine connected to the exhaust system.

19. The system of claim 14, wherein the exhaust system includes a selective catalytic reduction catalyst downstream of the connection of the doser to the exhaust system.

20. The method of claim 1, further comprising, in response to the metering valve being in the closed condition due to either the quantity of reductant to inject from the dosing command being less than the threshold amount or due to the differential pressure being less than the second differential pressure threshold, determining an integrated dosing command;

measuring the differential pressure across the metering valve; and opening the metering valve from the closed condition when the quantity of reductant to inject from the integrated dosing command is more than the threshold amount and, if the metering valve is in the closed condition in response to the differential pressure being less than the first differential pressure threshold, when the differential pressure is more than a second differential pressure threshold, wherein the second differential pressure threshold is greater than the first differential pressure threshold.

21. The method of claim 20, wherein determining the integrated dosing command includes integrating a dosing quantity required to satisfy emissions aftertreatment requirements in view of operating conditions.

22. The method of claim 21, wherein the threshold amount comprises a multiple of a dosing rate at which reductant is injected from the metering valve.

23. The method of claim 22, further comprising, in response to the metering valve being in the open condition due to the differential pressure across the metering valve being more than the first differential pressure threshold or the injected quantity of reductant being less than the integrated dosing command, measuring the differential pressure across the metering valve;

measuring the injected quantity of reductant; and closing the metering valve from an open condition when either a differential pressure across the metering valve is less than a first differential pressure threshold or the measured quantity of injected reductant is greater than the quantity of reductant to inject from the integrated dosing command.

\* \* \* \* \*